US010809435B2

(12) United States Patent
Wang et al.

(10) Patent No.: US 10,809,435 B2
(45) Date of Patent: Oct. 20, 2020

(54) BACKLIGHT UNIT, METHOD FOR MANUFACTURING THE SAME AND DISPLAY DEVICE

(71) Applicant: BOE TECHNOLOGY GROUP CO., LTD., Beijing (CN)

(72) Inventors: Wei Wang, Beijing (CN); Xiandong Meng, Beijing (CN); Jifeng Tan, Beijing (CN); Jian Gao, Beijing (CN); Xiaochuan Chen, Beijing (CN); Jing Lv, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/338,307

(22) PCT Filed: Jul. 23, 2018

(86) PCT No.: PCT/CN2018/096660
§ 371 (c)(1),
(2) Date: Mar. 29, 2019

(87) PCT Pub. No.: WO2019/029349
PCT Pub. Date: Feb. 14, 2019

(65) Prior Publication Data

US 2020/0018885 A1 Jan. 16, 2020

(30) Foreign Application Priority Data

Aug. 7, 2017 (CN) .......................... 2017 1 0665596

(51) Int. Cl.
*F21V 8/00* (2006.01)

(52) U.S. Cl.
CPC ......... *G02B 6/0016* (2013.01); *G02B 6/0036* (2013.01); *G02B 6/0065* (2013.01); *G02B 6/0073* (2013.01)

(58) Field of Classification Search
None
See application file for complete search history.

(56) References Cited

U.S. PATENT DOCUMENTS 5,745,266 A 4/1998 Smith
2014/0140653 A1 5/2014 Brown et al.
2019/0146139 A1* 5/2019 Joo ..................... G02B 6/0036 362/613

FOREIGN PATENT DOCUMENTS

CN 1463369 A 12/2003
CN 1685291 A 10/2005
(Continued)

OTHER PUBLICATIONS

International Search Report dated Oct. 26, 2018 corresponding to application No. PCT/CN2018/096660.

*Primary Examiner* — Ashok Patel
(74) *Attorney, Agent, or Firm* — Nath, Goldberg & Meyer; Joshua B. Goldberg

(57) ABSTRACT

A backlight unit, a method for manufacturing the same and a display device are provided. The backlight unit includes a light guide plate, an LED layer and an optical microstructure layer. The light guide plate includes a light incident surface and a light exit surface opposite to the light incident surface. The LED layer is provided on the light incident surface of the light guide plate, and includes plural LED chips arranged in an array. The optical microstructure layer is provided on one of the light incident surface and the light exit surface of the light guide plate, and includes plural optical microstructures in one-to-one correspondence with the plural LED chips. Each of the plural optical microstructures is config- (Continued)

ured to cause at least a portion of light emitted from a corresponding LED chip to propagate in the light guide plate by total internal reflection.

19 Claims, 8 Drawing Sheets

(56) References Cited

FOREIGN PATENT DOCUMENTS

| | | | | |
|---|---|---|---|---|
| CN | 1987606 | A | 6/2007 | |
| CN | 101889224 | A | 11/2010 | |
| CN | 102636835 | A | 8/2012 | |
| CN | 103221738 | A | 7/2013 | |
| CN | 104121517 | A | 10/2014 | |
| CN | 105892057 | A | 8/2016 | |
| CN | 106896579 | A | 6/2017 | |
| CN | 107229088 | A | 10/2017 | |
| EP | 1398650 | A1 * | 3/2004 | ............ G09F 13/04 |

* cited by examiner

BACKLIGHT UNIT, METHOD FOR MANUFACTURING THE SAME AND DISPLAY DEVICE

CROSS-REFERENCE TO RELATED APPLICATIONS

This is a National Phase Application filed under 35 U.S.C. 371 as a national stage of PCT/CN2018/096660, filed Jul. 23, 2018, an application claiming the benefit of Chinese Patent Application No. 201710665596.0, filed on Aug. 7, 2017, the contents of each of which are incorporated herein in their entirety by reference.

TECHNICAL FIELD

The present disclosure relates to the field of display technology, and in particular, relates to a backlight unit, a method for manufacturing the same, and a display device.

BACKGROUND

For the formation of complex and fine optical microstructures on a large-sized product, a nanoimprint technology is widely recommended in the industry at present. The basic principle of the nanoimprint technology is to imprint, by a mechanical force (e.g., under a high temperature and a high pressure), nanopatterns of a stencil on a substrate coated with a polymer material, to replicate the nanopatterns in a one-to-one proportion. The nanoimprint technology has the economic advantages of low cost and high output due to the omission of a lithography mask and an optical imaging equipment.

SUMMARY

Embodiments of the present disclosure provide a backlight unit, a method for manufacturing the same, and a display device.

Some embodiments of the present disclosure provide a backlight unit, which includes a light guide plate including a light incident surface and a light exit surface opposite to the light incident surface;

an LED layer provided on the light incident surface of the light guide plate, and including a plurality of LED chips arranged in an array; and an optical microstructure layer provided on one of the light incident surface and the light exit surface of the light guide plate, and including a plurality of optical microstructures in one-to-one correspondence with the plurality of LED chips, wherein each of the plurality of optical microstructures is configured to cause at least a portion of light emitted from a corresponding LED chip to propagate in the light guide plate by total internal reflection.

In an embodiment, each of the plurality of optical microstructures is a holographic grating structure.

In an embodiment, the optical microstructure layer is provided between the light guide plate and the LED layer, and each of the plurality of optical microstructures is a transmissive holographic grating structure.

In an embodiment, the optical microstructure layer is provided on the light exit surface of the light guide plate, and each of the plurality of optical microstructures is a reflective holographic grating structure.

In an embodiment, the holographic grating structure includes a plurality of sub-gratings arranged with an interval therebetween, and the plurality of sub-gratings are configured to cause light incident thereon to propagate in substantially a same direction after being diffracted or reflected by the plurality of sub-gratings.

In an embodiment, the holographic grating structure is substantially a circle as a whole and includes a plurality of ring structures, and the plurality of ring structures are concentrically arranged with a center of an orthographic projection of the LED chip corresponding to the holographic grating structure including the plurality of ring structures on the optical microstructure layer as a center of the circle.

In an embodiment, an average refractive index of the sub-grating located at an edge of each optical microstructure is greater than an average refractive index of the sub-grating located at a center of the optical microstructure.

In an embodiment, the backlight unit further includes a textured pattern structure provided on at least one of the light incident surface and the light exit surface of the light guide plate, and configured to cause at least a portion of light coupled into the light guide plate to exit from the light guide plate.

In an embodiment, the textured pattern structure includes a textured pattern film, and the optical microstructure layer and the textured pattern film are provided on the light incident surface and the light exit surface of the light guide plate, respectively.

In an embodiment, the textured pattern structure includes a textured pattern film, the optical microstructure layer and the textured pattern film are both provided on the light exit surface of the light guide plate, and the optical microstructure layer is provided between the light guide plate and the textured pattern film.

In an embodiment, the textured pattern structure and the optical microstructure are provided in a same layer.

In an embodiment, the textured pattern structure further includes a plurality of holes provided in the light guide plate at positions corresponding to at least a portion of regions other than the plurality of optical microstructures of the optical microstructure layer.

In an embodiment, each of the plurality of holes has a depth greater than 50 μm, or penetrates through the light guide plate.

In an embodiment, a cross section of each of the plurality of holes in a direction perpendicular to a stacking direction, along which the light guide plate and the optical microstructure layer are stacked, is one of a rectangle, an isosceles triangle, and an irregularly curved surface.

In an embodiment, each of the plurality of holes is provided with a dielectric material therein, and a difference value between a refractive index of the dielectric material and a refractive index of the light guide plate is greater than a predetermined value that is not less than 0.5.

Some embodiments of the present disclosure provide a display device, which includes the backlight unit according to any one of the above embodiments of the present disclosure.

Some embodiments of the present disclosure provide a method for manufacturing a backlight unit, the method including steps of preparing a light guide plate including a light incident surface and a light exit surface opposite to the light incident surface;

forming an LED layer on the light incident surface of the light guide plate, wherein the LED layer includes a plurality of LED chips arranged in an array; and forming an optical microstructure layer on one of the light incident surface and the light exit surface of the light guide plate, wherein the optical microstructure layer includes a plurality of optical microstructures in one-to-one correspondence with the plurality of LED chips, and each of the plurality of optical microstructures is configured to cause at least a portion of light emitted from a corresponding LED chip to propagate in the light guide plate by total internal reflection.

In an embodiment, the step of forming an optical microstructure layer on one of the light incident surface and the light exit surface of the light guide plate includes steps of forming a photopolymer film on one of the light incident surface and the light exit surface of the light guide plate; and performing holographic exposure on the photopolymer film to form the optical microstructure layer.

In an embodiment, the step of performing holographic exposure on the photopolymer film includes steps of performing phase modulation on a laser beam by desired laser wavefront modulation to obtain a modulated laser beam; and performing exposure on the photopolymer film by using the modulated laser beam.

In an embodiment, the method further includes a step of performing uniform exposure on the entire of the photopolymer film.

In an embodiment, the method further includes a step of forming a textured pattern structure, wherein the textured pattern structure is provided on at least one of the light incident surface and the light exit surface of the light guide plate, and configured to cause at least a portion of light coupled into the light guide plate to exit from the light guide plate.

In an embodiment, the step of forming a textured pattern structure include a step of forming a plurality of holes, wherein the plurality of holes are provided in the light guide plate and correspond to at least a portion of regions other than the plurality of optical microstructures of the optical microstructure layer.

In an embodiment, the method further includes a step of providing a dielectric material in each of the plurality of holes, wherein a difference value between a refractive index of the dielectric material and a refractive index of the light guide plate is greater than a predetermined value that is not less than 0.5.

DETAILED DESCRIPTION

To enable one of ordinary skill in the art to better understand technical solutions of the present disclosure, an optical microstructure, a method for manufacturing an optical microstructure, a backlight unit, and a display device according to the present disclosure will be further described below in detail with reference to the accompanying drawings.

The inventors of the present disclosure found that in a practical industrial application, the nanoimprint technology has the disadvantages that it is difficult to manufacture an imprint stencil for a large-sized product, a defect is prone to occur when imprinting is performed on a cross-scale microstructure, a phase distribution of a holographic lens is changed due to lamination of or filling between film layers, and the like. The above disadvantages of the nanoimprint technology limit the feasibility of mass production and the reliability of a product. Therefore, it is desirable to provide an optical microstructure, a method for manufacturing an optical microstructure, a backlight unit, and a display device, which are capable of manufacturing a large-sized product, manufacturing a cross-scale optical microstructure by manufacturing sub-blocks thereof, and avoiding the change of a phase distribution of a holographic lens due to lamination of or filling between film layers, and thereby achieving improved feasibility of mass production and improved reliability of a product.

Figure 1:
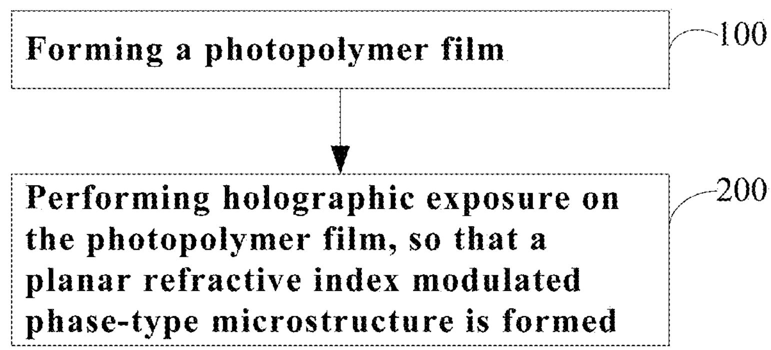
FIG. 1 is a schematic flowchart showing a method for manufacturing an optical microstructure according to an embodiment of the present disclosure.

Referring to FIG. 1, an embodiment of the present disclosure provides a method for manufacturing an optical microstructure. The method may include the following steps 100 and 200.

The step 100 includes forming a photopolymer film. For example, the photopolymer film may be formed on the light incident surface or the light exit surface of the light guide plate, or may be formed on any suitable substrate. The light guide plate may be a known light guide plate.

The step 200 includes performing holographic exposure on the photopolymer film, so that a planar refractive index modulated phase-type microstructure is formed.

The photopolymer film may be made of a transparent resin which has advantages of high photosensitivity, high resolution, high diffraction efficiency, high signal to noise ratio, and the like. Refractive indexes of portions of the photopolymer film may be changed after being exposed, for example, according to the intensities of light irradiated onto the portions, thereby forming a distribution of refractive index modulation (e.g., the refractive indexes are changed according to a change of the distribution, in a three-dimension space, of the intensities of light irradiated onto the portions). The term "planar" means that in a case where a surface of the photopolymer film is a plane, although the refractive indexes of the portions of the photopolymer film are changed, the surface is still a plane.

Figure 3A:
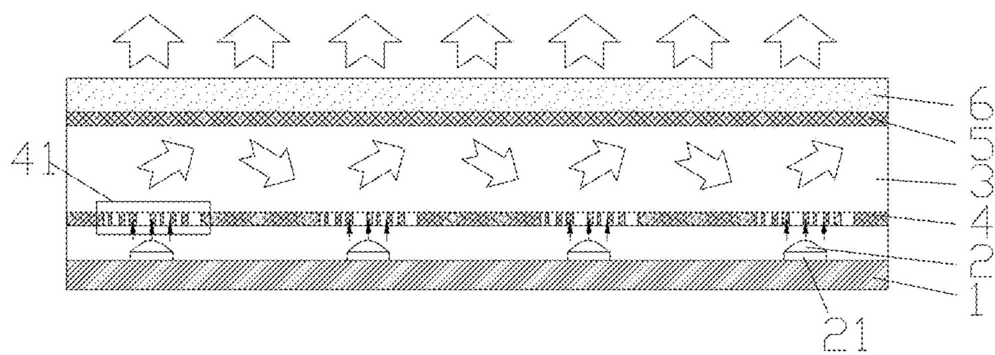
FIG. 3A is a schematic diagram showing a structure of a backlight unit according to an embodiment of the present disclosure.

The method for manufacturing an optical microstructure according to an embodiment of the present disclosure may be employed to manufacture an optical microstructure (may also be referred to as a holographic lens or a holographic grating structure, and the term "holographic grating structure" may be simply referred to as "grating structure" hereinafter) 41 or an optical microstructure layer 4 as shown in FIG. 3A, which will be described below. Further, in a case where the photopolymer film is formed on the light incident surface of the light guide plate, a transmissive holographic grating structure may be formed by the above method. In a case where the photopolymer film is formed on the light exit surface of the light guide plate, a reflective holographic grating structure may be formed after exposure is performed on the photopolymer film by using the above method. The transmissive holographic grating structure has a thickness in the same order of magnitude as a wavelength of incident light. For example, the transmissive holographic grating structure may have a thickness ranging from 300 nm to 500 nm. The reflective holographic grating structure has a thickness greater than the thickness of the transmissive holographic grating structure, for example, the thickness of the reflective holographic grating structure may range from 2 μm to 100 μm. The reflective holographic grating structure may be a Bragg grating. The method for manufacturing an optical microstructure according to the present embodiment of the present disclosure is capable of manufacturing a large-sized product, and manufacturing respective sub-blocks for a cross-scale optical microstructure. Further, the resultant planar optical microstructure can avoid the change of a phase distribution of a holographic lens due to lamination of film layers or filling between film layers. Thus, improved feasibility of mass production and improved reliability of a product can be achieved.

Figure 2:
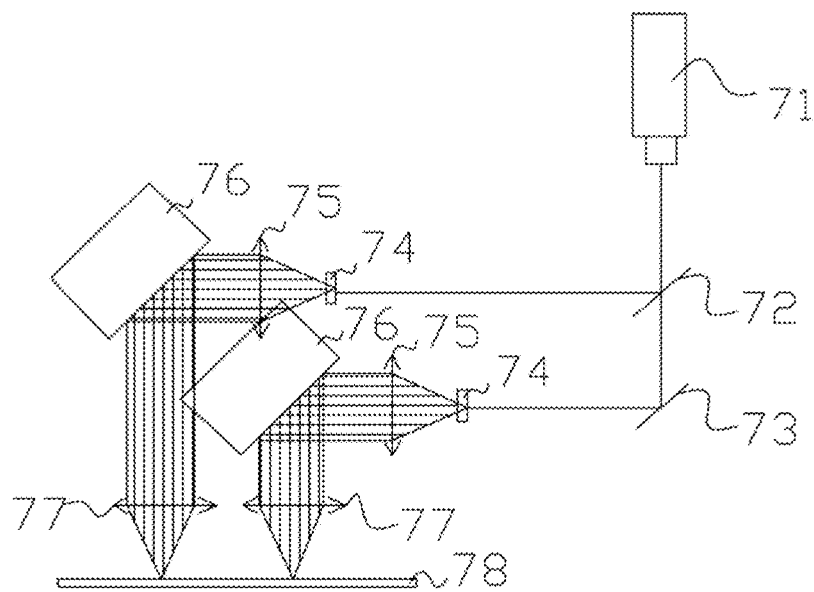
FIG. 2 is a schematic diagram illustrating how to carry out a method for manufacturing an optical microstructure according to an embodiment of the present disclosure.

As shown in FIG. 2, in an embodiment, the step 200 may include the following steps of: performing phase modulation on a laser beam to form the desired laser wavefront modulation, and exposing a photopolymer film 78 with the modulated laser beam. In an embodiment, the phase modulation is performed on the laser beam by using a phase function of the desired grating, and then the photopolymer film 78 is exposed by using the modulated laser beam, to form the desired holographic grating structure. The holographic grating structure may have the same function as the diffraction function of a conventional grating. In an embodiment, after phase modulation is performed on the laser beam by using the phase function of the desired grating, phase modulation may be further performed on the laser beam by using a phase function of the desired lens (e.g., a convex lens), and then the photopolymer film 78 is exposed by using the modulated laser beam, thereby forming a holographic grating structure having a collimation function. In an embodiment, a superposition function of the phase function of the desired grating and the phase functions of desired lens may be employed to perform phase modulation on the laser beam, and then the photopolymer film 78 may be exposed by using the modulated laser beam, thereby also forming a holographic grating structure having a collimation function. By adjusting the phase function of a grating, a diffraction angle of diffracted light and a reflection angle of reflected light of the formed holographic grating structure may be adjusted. The phase function of a grating and the phase function of a lens are known in the related art. For example, the phase function $\phi$ lens(R) of a lens without a spherical aberration may be as follows:

$$\phi_{lens}(R) = -n\frac{2\pi}{\lambda}\left(\sqrt{R^2 + f^2} - f\right)$$

where R is a diameter of the lens, f is a focal length of the lens, n is a refractive index of the material of the lens, and $\lambda$ is a wavelength of the light used for exposure. Further, the phase function $\phi_{grating}$ of a grating may be as follows:

$$\phi_{grating} = \frac{2\pi}{\lambda}\vec{r}\cdot\vec{R}$$

Where $\vec{r}$ is a light deflection direction vector due to diffraction or reflection by the grating, $\vec{R}$ is a position vector originating from a center of a slit or an aperture of the grating, and $\lambda$ is the wavelength of the light used for exposure.

In an embodiment, an apparatus employed to perform the step of performing phase modulation on a laser beam may include a laser 71, a beam splitter 72, a reflector 73, two beam expanders 74, two collimator lenses 75, two phase spatial light modulators 76 and two convergent lenses 77, which are arranged in a light path sequentially. For example, a laser beam emitted from the laser 71 may be modulated by the phase spatial light modulators (SLMs) 76 under control of a computer, to generate the desired laser wavefront modulation. For example, the phase spatial light modulators 76 may be configured to modulate the laser beam with a phase function of a grating and/or a phase function of a lens. The modulated laser beam is irradiated on the photopolymer film 78 to make the photopolymer film 78 exposed, so that a planar refractive index modulated phase-type microstructure is formed. It should be noted that, although the example shown in FIG. 2 includes two exposure light paths, the present disclosure is not limited thereto. For example, one exposure light path shown in FIG. 2 that includes the beam splitter 72, the beam expander 74, the collimator lenses 75, the phase spatial light modulators 76 and the convergent lenses 77, such that the apparatus employed to perform the step of performing phase modulation on a laser beam may include only one exposure light path. Further, according to the above manner, the apparatus employed to perform the step of performing phase modulation on a laser beam may include three or more exposure light paths, so as to increase the efficiency of manufacturing.

As another technical solution, an embodiment of the present disclosure provides a method for manufacturing an optical microstructure layer. The method for manufacturing an optical microstructure layer may include the following steps of: forming a photopolymer film (this step may be the same as the above step 100), performing holographic exposure on regions, in each of which an optical microstructure is to be formed (e.g., the regions in each of which the optical microstructure 41 is located, as shown in FIG. 3A), of the photopolymer film to form phase-type microstructures (e.g., the plurality of optical microstructures 41 as shown in FIG. 3A), and performing uniform exposure on the entire of the photopolymer film (e.g., the optical microstructure layer 4 as shown in FIG. 3A). For example, uniform exposure may be performed on the entire of the photopolymer film by using a light beam of uniform intensity.

By performing uniform exposure on the entire of the photopolymer film, other regions (e.g., other regions of the optical microstructure layer 4 than the plurality of optical microstructures 41, as shown in FIG. 3A) may have a desired refractive index, so as to complete the manufacture of the optical microstructure layer 4.

In an embodiment, to increase an exposure speed, the modulated laser beam may include a plurality of exposure light paths (e.g., two exposure light paths are shown in FIG. 2), and at least a portion of all regions in which all the optical microstructures are to be formed is exposed by the plurality of exposure light paths simultaneously, thereby forming a plurality of phase-type microstructures (i.e., the plurality of optical microstructures 41) simultaneously. Further, different exposure light paths may include components having completely identical parameters or having parameters different from each other, thereby forming identical or different phase-type microstructures.

In a practical application, the photopolymer film may have a thickness ranging from 5 nm to 300 mm, but the present disclosure is not limited thereto. For example, the thickness of the photopolymer film may be determined according to a specific design (e.g., $\Delta n*d$ required for the design) and a selected material, where $\Delta n$ is the maximal difference value in refractive index between an exposed region and a non-exposed region (or between a region with the highest degree of exposure and a region with the lowest degree of exposure) after the photopolymer film is exposed, d is a thickness of the photopolymer film, and thus $\Delta n*d$ represents the maximal capacity of phase modulation for the photopolymer film. Further, a distribution of refractive indexes in each period of each of the phase-type microstructures (e.g., each of the optical microstructures 41 shown in FIG. 3A) may be determined by software optimization. For example, in consideration of the difficulty of a manufacturing process, the distribution of refractive indexes in each period may be determined such that the difficulty of a manufacturing process and the performance of a device are balanced and meet requirements.

Further, the photopolymer film may be formed on a light incident surface (e.g., the lower surface of the light guide plate 3 shown in FIG. 3A) or a light exit surface (e.g., the upper surface of the light guide plate 3 shown in FIG. 3A) of a light guide plate (e.g., the light guide plate 3 shown in FIG. 3A), and a region in which an optical microstructure is to be formed corresponds to an irradiated region on which incident light (e.g., light or a light beam emitted from each LED chip) directly irradiates. For example, the irradiated region may be an intersecting region of a light beam emitted from each LED chip and the light incident surface or the light exit surface of the light guide plate. For example, the light beam emitted from each LED chip may be a divergent beam. In an embodiment, a divergence angle of the light beam emitted from each LED chip (i.e., the maximal angle between any two light rays in the light beam) may be about 30 degrees, because it is difficult to design the optical microstructure layer 4 in a case where the divergence angle is too large, whereas it is disadvantageous for the uniformity of light exiting from the backlight unit in a case where the divergence angle is too small. Each optical microstructure 41 is configured to cause at least a portion of incident light to propagate in the light guide plate by total internal reflection, after the incident light is transmitted through the optical microstructure or reflected by the optical microstructure. The light propagating in the light guide plate by total internal reflection may be guided to the exterior of the light guide plate through each of non-irradiated regions (i.e., regions of the light incident surface or the light exit surface of the light guide plate other than the irradiated regions as described above). By causing the light in the light guide plate to exit from the light guide plate through each of the non-irradiated regions, a light extraction efficiency of each irradiated region and a light extraction efficiency of each non-irradiated region may be balanced, which is advantageous for the uniformity of light exiting from the backlight unit. In this case, the holographic refractive index modulation distribution of the phase-type microstructure may be designed for the wavefront distribution of the light emitted from each of the LED chips, and the wavefront (which is approximate to the Lambertian distribution) of the light emitted from each of the LED chips may be converted into a waveguide mode in which light propagates in the light guide plate by total internal reflection. Specifically, a phase distribution of each of the phase-type microstructures may be in the form of powers the x and y coordinates as follows: $x_0+y_0+A_{10}x+A_{01}y+A_{20}x^2+A_{02}y^2+A_{11}xy+A_{30}x^3+A_{03}y^3+A_{21}x^2y+A_{12}xy^2+\ldots$, where the xy coordinate system is located at a surface of each of the phase-type microstructures, and an origin point thereof is located at a center of each of the phase-type microstructures.

Further, in a case where the phase modulation distribution of each of the phase microstructure produces an optical modulation effect similar to that of a Fresnel lens, the phase modulation distribution may also be in a quadratic form of the above power series. The specific design of each of the phase microstructures may be determined according to a combination of a simulation algorithm (e.g., a scalar theory, an angular spectrum theory, an RCWA—strict coupled wave analysis algorithm, an FDTD—time domain finite difference algorithm, an FEM—finite element algorithm, or the like) and a numerical optimization algorithm (e.g., a genetic algorithm, a simulated annealing algorithm, a bee colony algorithm, or the like), and according to a specific requirement (e.g., the light emitted from each of the LED chips is required to be efficiently converted into a waveguide mode in which light propagates in the light guide plate by total internal reflection), thereby providing the coefficients of the above power series.

Figure 3B:
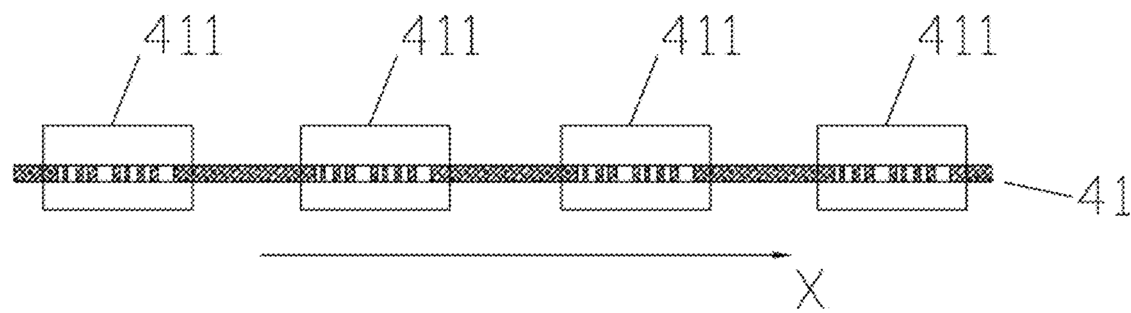
FIG. 3B is a schematic diagram showing distribution of phase-type microstructures shown in FIG. 3A in a direction X.
Figure 3C:
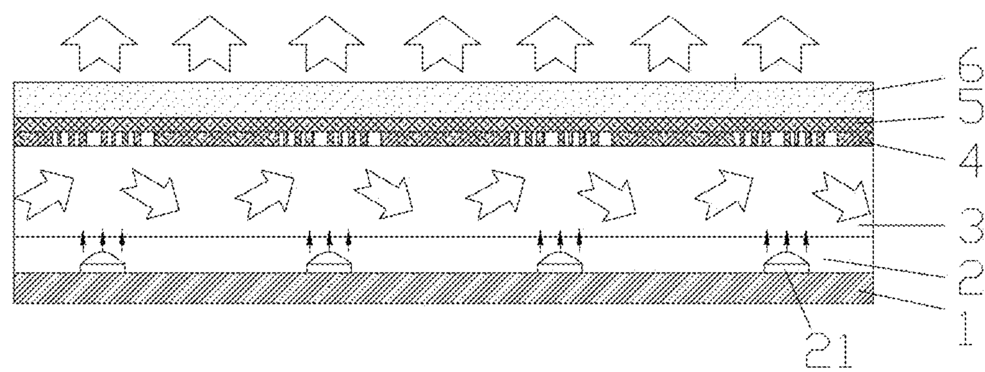
FIG. 3C is a schematic diagram showing a structure of another backlight unit according to an embodiment of the present disclosure.

As another technical solution, referring to FIGS. 3A to 3C, some embodiments of the present disclosure provide a backlight unit. The backlight unit may include a light guide plate 3, an LED layer 2, and an optical microstructure layer 4. The light guide plate 3 includes a light incident surface and a light exit surface opposite to the light incident surface. In an embodiment, the LED layer 2 is provided on the light incident surface of the light guide plate, and includes a plurality of LED chips 21 arranged in an array. The optical microstructure layer 4 may be provided on the light incident surface (as shown in the example of FIG. 3A) of the light guide plate 3 as a holographic lens, and include a plurality of optical microstructures 41 in one-to-one correspondence with the plurality of LED chips 21. Each of the plurality of optical microstructures 41 causes at least a portion of the light emitted from the corresponding LED chip 21 to propagate in the light guide plate 3 by total internal reflection. For example, each of the optical microstructures 41 may be a holographic grating structure.

In the present embodiment, the backlight unit may further include a reflection layer 1, which may be provided at a side of the LED layer 2 distal to the optical microstructure layer 4, as shown in FIG. 3A.

Each of the LED chips 21 may be an inorganic semiconductor chip (e.g., a Micro-LED chip) including a light emitting diode, or may be an OLED chip including an organic light emitting diode. The light emitted from each of the LED chips 21 may be blue light or ultraviolet light. An interval between any adjacent two of the LED chips 21 may range from 1 mm to 50 mm, but the present disclosure is not limited thereto. For example, an interval between any adjacent two of the LED chips 21 may be determined according to the balance between the backlight power consumption and the adjustment accuracy of local diming of a product design.

The reflection layer 1 reflects light emitted from each of the LED chips 21, for example, reflects the full band of visible light or the light band of a certain color, to increase light utilization. The reflection layer 1 may be a single metal layer, and may have a thickness ranging from 50 nm to 200 nm. Alternatively, the reflection layer 1 may be a film coated with a metal reflective film, and may have a thickness ranging from 0.1 mm to 2 mm. Alternatively, the reflection layer 1 may be a multilayer dielectric film. Further, the reflection layer 1 may be a film occupying an entire layer, and provided at a side of the LED layer 2 distal to a light exit side of the LED layer 2. Alternatively, the reflection layer 1 may be provided at the light exit side of the LED layer 2, and distributed in regions other than the LED chips 21.

As shown in FIG. 3A, the optical microstructure layer 4 is located at the light exit side of the LED layer 2 and on the light incident surface of the light guide plate 3. The optical microstructure layer 4 includes the optical microstructures 41 obtained by performing holographic exposure on the photopolymer film as described above, and the optical microstructures 41 correspond to the irradiated regions. Each of the optical microstructures 41 transmits at least a portion of light emitted from the corresponding LED chip 21, such that the portion of light is coupled into the light guide plate 3 and propagates in the light guide plate 3 by undergoing total internal reflection (i.e., propagates in the light guide plate 3 by total internal reflection in the waveguide mode). Then, the light in the light guide plate 3 may exit from the light guide plate 3 through the irradiated regions and the non-irradiated region of the light exit surface. In this way, the light extraction efficiency of each irradiated region and the light extraction efficiency of each non-irradiated region of the light exit surface of the light guide plate 3 may be balanced, thereby achieving uniformity of light exiting from the backlight unit. Propagation directions of light in the backlight unit are shown by the arrows in FIG. 3A.

In the present embodiment, referring to FIG. 3B, each of the optical microstructures 41 may be circular (i.e. may be substantially a circle as a whole) and include a plurality of sub-gratings 411 each having a desired refractive index distribution in the radial direction X thereof (or in the lengthwise of each optical microstructure 41 in a case where each optical microstructure 41 is a rectangle). As shown in FIG. 3B, in the direction X, the plurality of sub-gratings 411 are arranged with an interval therebetween. The plurality of sub-gratings 411 may be configured to cause the light incident thereon to propagate in substantially a same direction after being diffracted or reflected by the plurality of sub-gratings 411. As described above, since a light beam has a certain divergence angle, an incident angle of a light ray at an edge of the light beam on the corresponding sub-grating 411 is greater than an incident angle of a light ray at a center of the light beam on the corresponding sub-grating 411. In an embodiment, the plurality of sub-gratings 411 may have different refractive index distributions. For example, an average refractive index of the sub-grating 411 at an edge of each optical microstructure 41 (i.e., an average value of the refractive indexes of regions of the sub-grating 411) is greater than an average refractive index of the sub-grating 411 at a center of the optical microstructure 41, such that the plurality of sub-gratings 411 of the optical microstructure 41 cause the light incident thereon to propagate in substantially a same direction after the light is diffracted or reflected by the plurality of sub-gratings 411.

Since the optical microstructure layer 4 is formed by performing holographic exposure on the photopolymer film 78, a large-sized product may be manufactured, a cross-scale optical microstructure may be manufactured by manufacturing sub-blocks thereof, and the change of a phase distribution of a holographic lens due to lamination of film layers or filling between film layers may be avoided, thereby achieving improved feasibility of mass production and improved reliability of a product.

Referring to FIG. 3A, the backlight unit may further include a textured pattern structure. The textured pattern structure may be provided on the light incident surface and/or the light exit surface of the light guide plate 3, and configured to cause the light coupled into the light guide plate 3 to exit from the light guide plate 3. For example, the textured pattern structure includes a textured pattern film 5, which is provided on the light exit surface of the light guide plate 3, and configured to cause the light coupled into the light guide plate 3 to exit from the light guide plate 3 (e.g., through the non-irradiated regions of the light exit surface of the light guide plate 3). That is, of the light coupled into the light guide plate 3 through the optical microstructures 41 and propagating therein by total internal reflection, at least a portion has its propagation by total internal reflection destroyed by the textured pattern film 5, such that the at least a portion of the light exits from the light guide plate 3 through the non-irradiated regions. In an embodiment, the textured pattern film 5 may be conventional textured patterns formed on the light guide plate 3 (e.g., each of the textured patterns may have a size ranging from 0.1 mm to 1 mm), or may be a grating structure formed according to the light emitted from the LED chips 21 and the optical microstructure layer 4, such that an intensity of the light exiting from the backlight unit is distributed uniformly.

In the present embodiment, the backlight unit may further include a fluorescent film 6 for converting blue light emitted from the LED chip 21 into white light. It should be noted that, in a practical application, the fluorescent film 6 may be omitted if the LED chip 21 is a chip emitting white light or an LED chip emitting light of colors including red (R), green (G), and/or blue (B). In this case, however, the fluorescent film 6 may also be provided for improving brightness uniformity and color quality.

It should be noted that, in the present embodiment, the optical microstructure layer 4 and the textured pattern film 5 are provided on the light incident surface and the light exit surface of the light guide plate 3, respectively. However, the present disclosure is not limited thereto. For example, in a practical application, as shown in FIG. 3C, the optical microstructure layer 4 and the textured pattern film 5 may be sequentially provided on the light exit surface of the light guide plate 3. In other words, the optical microstructure layer 4 may be provided between the light guide plate 3 and the textured pattern film 5. In this case, each optical microstructure 41 of the optical microstructure layer 4 couples the light emitted from the corresponding LED chip 21 into the light guide plate 3 by using the reflection characteristics of the optical microstructure 41 to propagate therein by total internal reflection. Therefore, the holographic refractive index modulation distribution of each optical microstructure 41 in FIG. 3C may be different from the holographic refractive index modulation distribution of each optical microstructure 41 in FIG. 3A (reference may be made to FIG. 4C and its related description).

It should be noted that, in a practical application, a diffusion film, a prism film, and/or a brightness enhancement film may be further provided on the fluorescent film 6 according to specific requirements, and the stacking order of these functional films may be adjusted according to the practical application, to meet the requirements of different products.

Figure 4A:
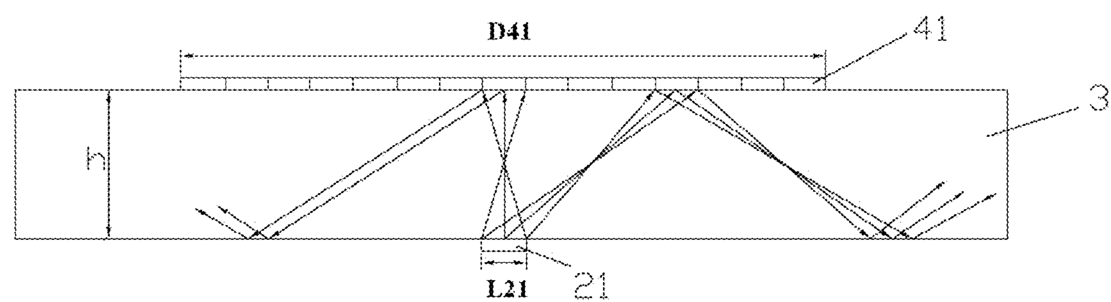
FIG. 4A is a schematic diagram showing light paths in a reflective phase-type microstructure according to an embodiment of the present disclosure.
Figure 4B:
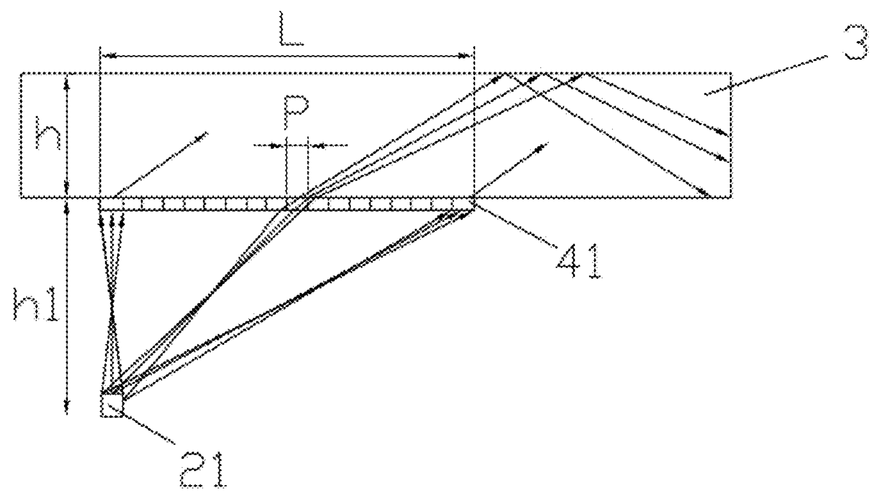
FIG. 4B is a schematic diagram showing light paths in a transmissive phase-type microstructure according to an embodiment of the present disclosure.
Figure 4C:
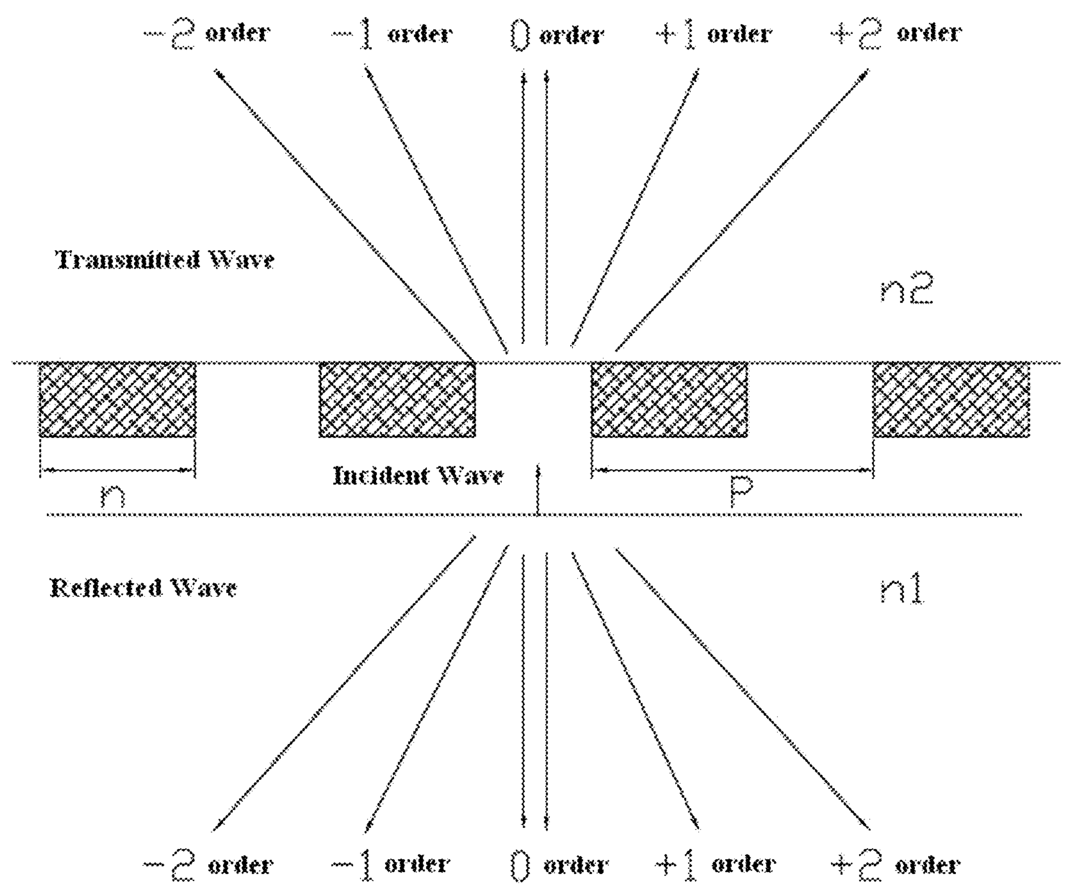
FIG. 4C is a schematic diagram showing diffracted wave of various orders for a phase-type microstructure according to an embodiment of the present disclosure.

Referring to FIGS. 4A to 4C, some embodiments of the present disclosure provide another backlight unit, which differs from that according to any one of the embodiments shown in FIGS. 3A to 3C in that, a distribution of refractive index modulation of each of the phase-type microstructures is designed by dividing the phase-type microstructure into regions (i.e. sub-blocks). Specifically, each of the phase-type microstructures is equally or unequally divided into a plurality of phase-type sub-microstructures having different refractive indexes, such that light incident on the phase-type sub-microstructures propagates in substantially a same direction and undergoes total internal reflection in the light guide plate 3, after being diffracted or reflected by the phase-type sub-microstructures. That is, as described above, the light beam emitted from each of the LED chips 21 has a certain divergence angle, and is incident on different regions of each of the phase-type microstructures at different incident angles. For example, a light ray at an edge of the light beam is incident on each phase-type microstructure at a greater incident angle than an incident angle at which a light ray at a center of the light beam is incident on the phase-type microstructure. Thus, some light rays of the light beam (e.g., a light ray at an edge of the light beam) may not meet the condition of total internal reflection after being coupled into the light guide plate 3 by the phase-type microstructure. By providing the plurality of phase-type sub-microstructures, among which the phase-type sub-microstructure corresponding to the light ray at the edge of the light beam has a greater refractive index than a refractive index of the phase-type sub-microstructure corresponding to the light ray at the center of the light beam, the light rays incident on the plurality of phase-type sub-microstructures all meet the condition of total internal reflection after being coupled into the light guide plate 3, thereby maximizing the light coupling efficiency of the phase-type sub-microstructures. Here, the light coupling efficiency may be a ratio of an amount of the incident light to an amount of light coupled into the light guide plate 3 and undergoing total internal reflection.

As shown in FIG. 4A, an optical microstructure 41 having a size of D41 (which is generally greater than 5 um) is provided on the light exit surface of the light guide plate 3 having a thickness h, as a holographic reflector. Further, the optical microstructure 41 is equally or unequally divided into a plurality of phase-type sub-microstructures, and the light rays emitted from any one of the LED chips 21 having a size L21 are all coupled into the light guide plate 3 and propagate therein by total internal reflection, after being reflected by different phase-type sub-microstructures, as shown by the light paths in FIG. 4A.

As shown in FIG. 4B, an optical microstructure 41 having a size L is provided on the light incident surface of the light guide plate 3 having a thickness h, as a holographic lens. A distance between any one of the LED chips 21 and the optical microstructure 41 is h1. Similar to the foregoing description, the optical microstructure 41 is equally or unequally divided into a plurality of phase-type sub-microstructures each having a size P, the light rays emitted from any one of the LED chips 21 are all coupled into the light guide plate 3 and propagate therein by total internal reflection, after being transmitted by different phase-type sub-microstructures, as shown by the light paths in FIG. 4B.

By equally or unequally dividing the optical microstructure 41 into a plurality of phase-type sub-microstructures, refractive indexes of different phase-type sub-microstructures may be adjusted according to an incident angle and a brightness of the incident light, thereby adjusting the brightness uniformity of the backlight unit more accurately.

As shown in FIG. 4C, a period of each of the optical microstructure 41 may be designed as follows. Theoretically, a diffraction angle $\theta$ of the diffracted wave of $m^{th}$ order of a grating is determined by a period P of the grating, a wavelength $\lambda$ of the incident light, and an incident angle $\theta_0$ of the incident light, as follows:

for the transmitted wave, $n_2 \sin\theta - n_1 \sin\theta_0 = m\lambda/P$, ($m=0, \pm1, \pm2, \ldots$), and for the reflected wave, $n_1 \sin\theta - n_1 \sin\theta_0 = m\lambda/P$, ($m=0, \pm1, \pm2, \ldots$), where $n_1$ is a refractive index of a dielectric at the incident side, $n_2$ is a refractive index of a dielectric at the light outgoing side. Generally, intensities of diffracted light of $0^{th}$ order and/or $1^{th}$ order of the grating are relatively large, and intensities of diffracted light of higher orders of the grating are much smaller relative to those of the previous orders. The diffracted wave of $0^{th}$ order is directed along the direction of the incident light, whereas diffraction directions of the diffracted waves of higher orders may be adjusted according to a period of the grating.

To convert the wavefront of light emitted from each of the LED chips 21 into propagation in the light guide plate 3 by total internal reflection, a reflection efficiency of the optical microstructure 41 at a large diffraction angle may be high. For example, in a case where a dielectric of the optical microstructure 41 has a refractive index of 1.5, a critical angle of total internal reflection for the interface between the dielectric and the air is 40°.

In an embodiment, a period of the optical microstructure 41 may be 1 um to 2 um, such that the incident light on each period of the optical microstructure 41 may be adjusted effectively, while there are enough distribution manners of refractive index to be selected. Alternatively, a period of the optical microstructure 41 may be a complex microstructure (e.g., a volume grating) with a size ranging from 200 nm to 1000 nm. It should be noted that, a period of the optical microstructure 41 may not too large, such that diffraction orders thereof are not too high.

Detail description of design and optimization of each of the phase-type microstructures will be made below. Specifically, a method for designing and optimizing each of the phase-type microstructures may include the following four aspects.

Aspect I includes selecting basic design specification.

The design specification may include a refractive index, a period of a grating, a thickness of the grating, a distribution of refractive index, and the like. Here, dielectrics (e.g., the air) at the incident side and the light outgoing side may both have a refractive index of 1, the light guide plate 3 may have a refractive index of 1.5, and a period of a grating of each optical microstructure 41 may be 1.6 um.

Aspect II includes selecting an object to be optimized.

The object to be optimized may include the number of diffraction orders, an optical variable, a wavelength range, an incident angle, and a polarization type. In an embodiment, for example, the number of diffraction orders may be 4, and the diffraction angle may be about 49°. For example, the optical variable may be a transmittance coefficient of corresponding diffraction for a transmitted wave. For example, the wavelength range may be about 450 nm, or may be a value range obtained by performing a weighting process on a wide spectrum. For example, the incident angle may be 0° (e.g., light is vertically incident on a surface of each of the optical microstructure 41 proximal to the LED layer 2), or may be obtained by performing a weighting process on incident angles for the plurality of phase-type sub-microstructures of the optical microstructure 41. For example, the polarization type may be a transverse electric (TE) polarization, transverse magnetic (TM) polarization, partially polarization, or unpolarized mode.

Aspect III includes selecting a simulation algorithm and an optimization algorithm.

The simulation algorithm may include strictly coupled wave analysis algorithm (which may also be referred to as an RCWA algorithm), a time domain finite difference algorithm (which may also be referred to as an FDTD algorithm), a finite element algorithm (which may also be referred to as an FEM algorithm), and the like. The optimization algorithm may include a genetic algorithm, a simulated annealing algorithm, a bee colony algorithm, and the like.

Aspect IV includes outputting an optimization result.

Figure 4D:
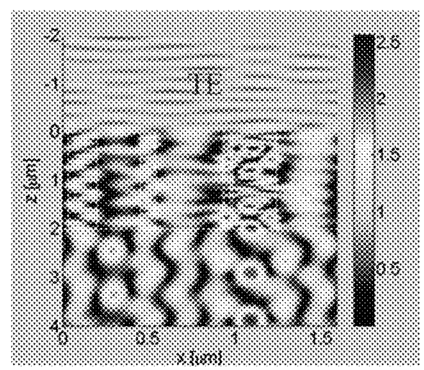
FIG. 4D is a schematic diagram showing a first optimization result of distribution of refractive indexes in each period of a phase-type microstructure.
Figure 4E:
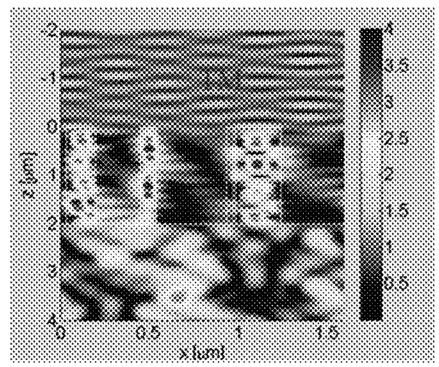
FIG. 4E is a schematic diagram showing a second optimization result of distribution of refractive indexes in each period of a phase-type microstructure.

By using the above example parameters, selecting TE polarized light and the RCWA (strictly coupled wave analysis) algorithm for simulation and optimization, and assuming that a modulation range of refractive index of the photopolymer is from 1.0 to 1.5, the optimization results for each of the phase-type microstructures as shown in FIG. 4D may be obtained in a case where a refractive index of 1.0 is selected. Similarly, the optimization results for each of the phase-type microstructures as shown in FIG. 4E may be obtained in a case where a refractive index of 1.5 and TM polarized light are selected. Examples of the optimization results are shown in the below Table 1.

TABLE 1

| the number of positions at which a refractive index changes | period of a grating | diffraction order | diffraction angle | Diffraction efficiency |
|---|---|---|---|---|
| 8 | 1.6 um (TE polarization) | −5 | 69.64 | 2.21% |
| | | −4 | 48.59 | 13.86% |
| | | −3 | 34.23 | 0.41% |
| | | −2 | 22.02 | 2.57% |
| | | −1 | 10.81 | 10.70% |
| | | 0 | 0.00 | 2.09% |
| | | 1 | −10.81 | 9.34% |
| | | 2 | −22.02 | 1.10% |
| | | 3 | −34.23 | 0.22% |
| | | 4 | −48.59 | 52.73% |
| | | 5 | −69.64 | 1.47% |
| 8 | 1.6 um (TE polarization) | −5 | 69.64 | 0.71% |
| | | −4 | 48.59 | 2.68% |
| | | −3 | 34.23 | 1.69% |
| | | −2 | 22.02 | 15.57% |
| | | −1 | 10.81 | 1.00% |
| | | 0 | 0.00 | 35.04% |
| | | 1 | −10.81 | 7.95% |
| | | 2 | −22.02 | 20.79% |
| | | 3 | −34.23 | 0.22% |
| | | 4 | −48.59 | 7.05% |
| | | 5 | −69.64 | 1.18% |
| Position for change | 0.021<br>0.585 | 0.125<br>0.609 | 0.284<br>0.617 | 0.340<br>0.775 |

Figure 5:
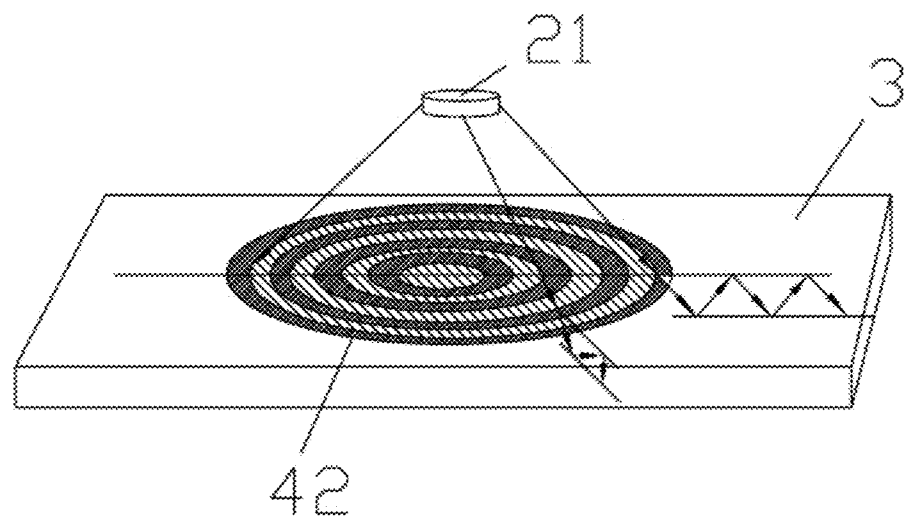
FIG. 5 is a schematic diagram showing a configuration of phase-type sub-microstructures included in an optical microstructure according to an embodiment of the present disclosure.

Distribution of the plurality of phase-type sub-microstructures equally or unequally divided from each of the optical microstructures 41 will be described below. Specifically, each of the optical microstructures 41 may be a grating structure, and each phase-type sub-microstructure of the optical microstructure 41 may be a ring structure 42. As shown in FIG. 5, the plurality of ring structures 42 of each optical microstructure 41 may have a concentric-ring distribution (i.e. concentrically distributed) by having a center of an orthographic projection of the LED chip 21 corresponding to the holographic grating structure 41 comprising the plurality of ring structures 42 on the optical microstructure layer 4 (or by having a center of an irradiated region of the LED chip 21 corresponding to the holographic grating structure 41 comprising the plurality of ring structures 42 on the optical microstructure layer 4) as a center of circle. Further, the plurality of ring structures 42 may have different widths and different refractive indexes. For example, in the radial direction away from the center of circle, the refractive indexes of the plurality of ring structures 42 may be increased sequentially, such that, the incident light, after being diffracted or reflected by the plurality of ring structures 42, is incident into the light guide plate 3 at substantially the same incident angle and undergoes total internal reflection in the light guide plate, thereby maximizing the light coupling efficiency of the optical microstructure 41 including the plurality of ring structures 42.

Figure 6:
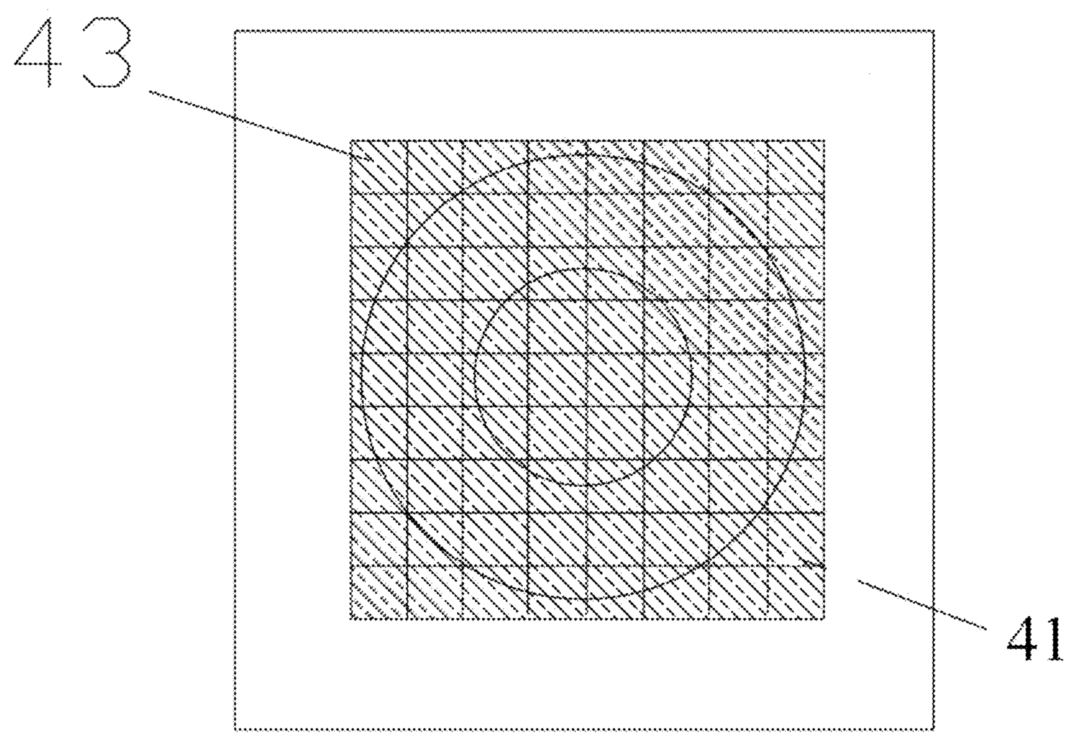
FIG. 6 is a schematic diagram showing a division manner of phase-type sub-microstructures included in an optical microstructure according to an embodiment of the present disclosure.

For ease of manufacturing the optical microstructure 41 including the plurality of ring structures 42 as shown in FIG. 5, in an embodiment, the optical microstructure 41 may be divided into a plurality of rectangular regions 43 distributed in a rectangular array, as shown in FIG. 6. A center of the rectangular array may be a center of the optical microstructure 41, or may be a center of an orthographic projection of the LED chip 21 corresponding to the optical microstructure 41 on the optical microstructure layer 4 (or on the optical microstructure 41). Each of the rectangular regions 43 may include portions of adjacent ones of the plurality of ring structures. The plurality of rectangular regions 43 may be manufactured separately, and then may be spliced to each other to form the circular holographic grating structure 41 including the plurality of ring structures 42 as shown in FIG. 5.

Figure 7A:
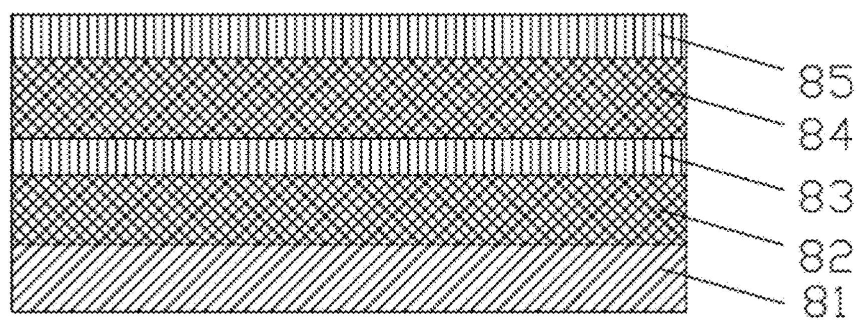
FIG. 7A is a schematic diagram showing a structure of a display device having a grating layer, according to an embodiment of the present disclosure.
Figure 7B:
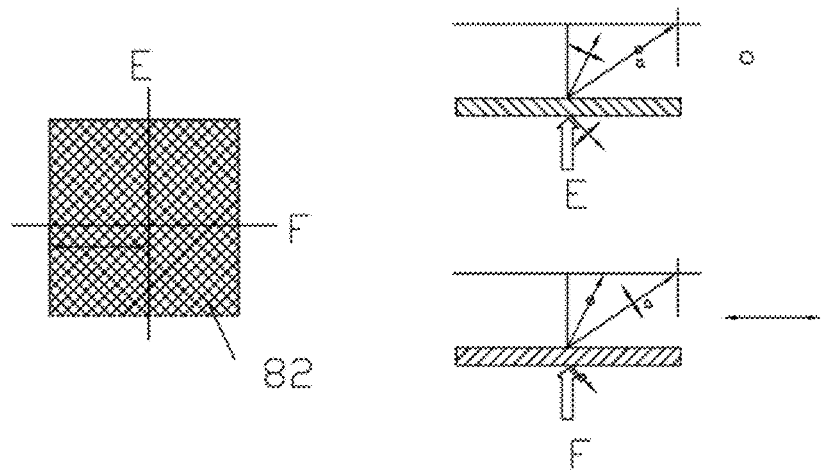
FIG. 7B is a schematic diagram showing a structure of a polarization dependent grating layer according to an embodiment of the present disclosure.

Referring to FIGS. 7A and 7B, an embodiment of the present disclosure provides a display device including a grating layer, and the display device includes an LED layer 81, a grating layer 82, a lower polarization layer 83, a display panel 84, and an upper polarization layer 85 from the bottom to the top sequentially. For example, the grating layer 82 may be the optical microstructure layer as described above. To further optimize the grating layer 82, the polarized light in the polarization direction of the lower polarization layer 83 is optimized in two directions perpendicular to each other (e.g., the direction E and the direction F as shown in FIG. 7B) of a two-dimension grating. For example, two one-dimension gratings in the direction E and in the direction F in a horizontal cross section of the grating layer 82 are shown at the upper right corner and the lower right corner of FIG. 7B, respectively, and the two one-dimension gratings may be superposed on each other to form a combined two-dimension grating. Here, an angle a is larger than the corresponding critical angle for total internal reflection. The two-way arrows and circles shown in FIG. 7B denote the polarization directions of the lower polarization layer 83 relative to the one-dimension gratings shown in FIG. 7B, respectively.

Since a microstructure of the grating layer 82 has a size equal to or less than a wavelength of the incident light, the grating layer respond to light of the TE polarization and the TM polarization differently, and thus is dependent on a polarization type. In this case, by adjusting the distribution of refractive indexes of microstructures in each single period of the grating, the effect of dependence on a polarization type may be maximized to form a grating significantly dependent on a polarization type. In this case, the grating may effectively diffract light of a certain polarization type at a certain diffraction order, whereas may weakly diffract light of another polarization type at the diffraction order.

Figure 8A:
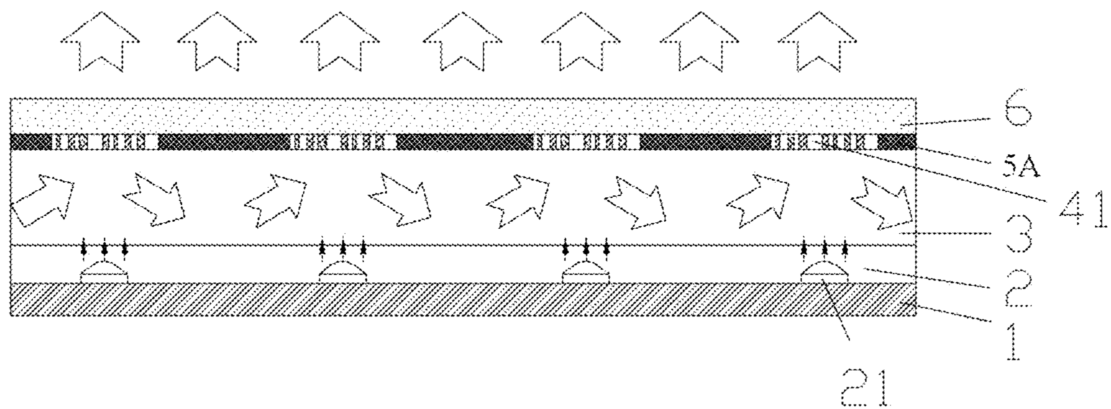
FIG. 8A is a schematic diagram showing a structure of a backlight unit according to an embodiment of the present disclosure.

Referring to FIG. 8A, an embodiment of the present disclosure provides another backlight unit, which differs from that according to any one of the embodiments corresponding to FIGS. 3A to 7B in that, the textured pattern structure and the optical microstructure 41 in the present embodiment each have a different structure.

Specifically, in the present embodiment, the textured pattern structure includes local area layers 5A. The local area layers 5A and the optical microstructures 41 are provided in a same layer (which corresponds to the optical microstructure layer 4, here, being provided in a same layer means that the local area layers and the optical microstructures are located in a same layer and may be formed simultaneously), and are located on the light exit surface of the light guide plate 3. Here, the local area layers 5A are provided in regions of the optical microstructure layer 4 other than the plurality of optical microstructures 41. Each of the optical microstructures 41 may corresponds to an irradiated region of the respective LED chip 21. Each of the local area layers 5A may be the textured pattern film 5.

Each of the optical microstructures 41 couples at least a portion of the light emitted from the corresponding LED chip 21 into the light guide plate 3 to propagate therein by total internal reflection (i.e., in a waveguide mode). Each of the local area layers 5A destroys the condition for total internal reflection of at least a portion of the light propagating in the light guide plate 3, to cause the at least a portion of the light to exit from the light guide plate 3 through the non-irradiated regions, thereby balancing the light extraction efficiencies of each irradiated region and each non-irradiated region, and making the light exiting from the backlight unit uniform.

Figure 8B:
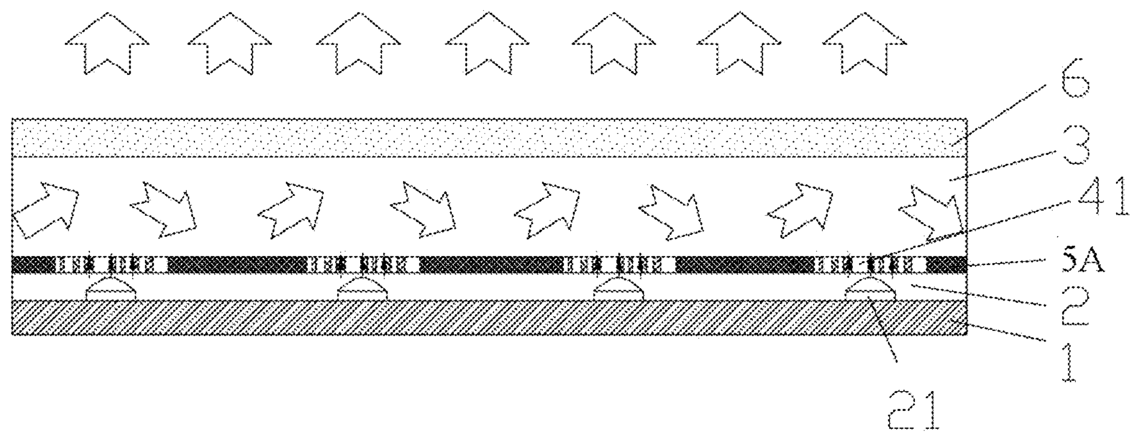
FIG. 8B is a schematic diagram showing a structure of another backlight unit according to an embodiment of the present disclosure.

In an embodiment, as shown in FIG. 8B, the optical microstructures 41 and the local area layers 5A provided in a same layer may be located on the light incident surface of the light guide plate 3.

Figure 9A:
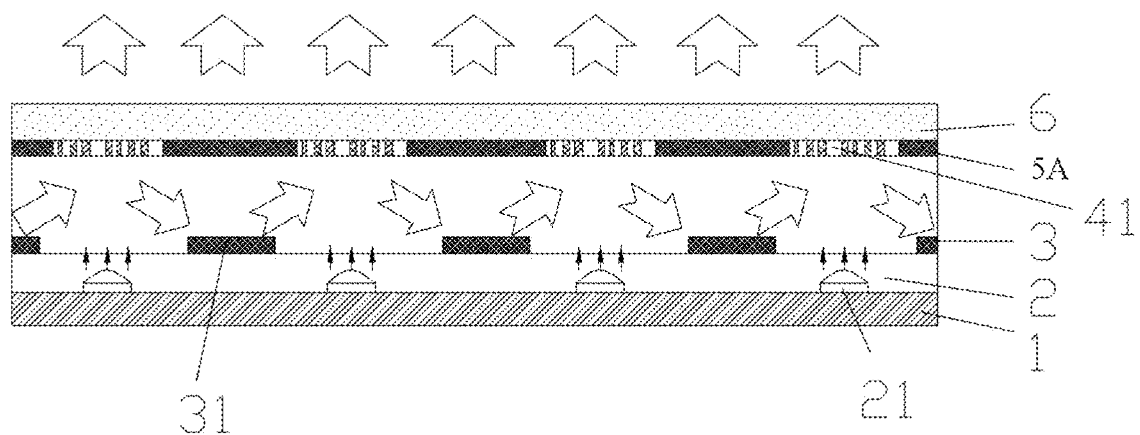
FIG. 9A is a schematic diagram showing a structure of another backlight unit according to an embodiment of the present disclosure.
Figure 9B:
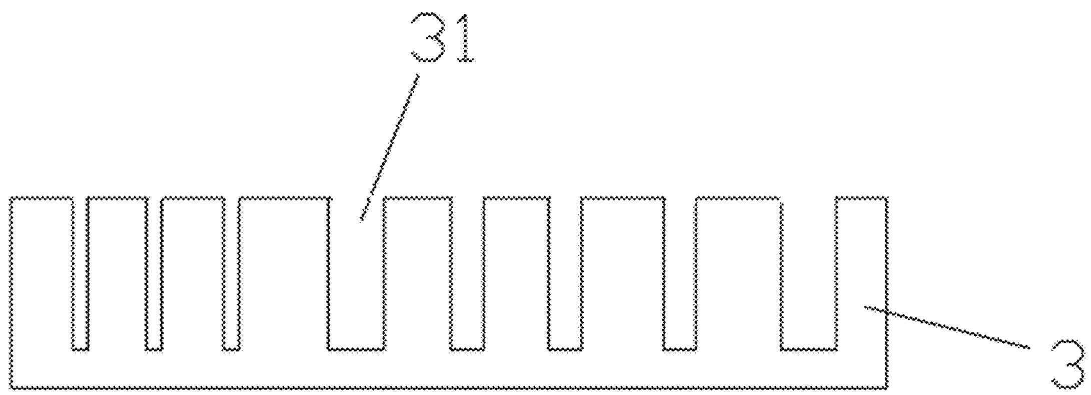
FIG. 9B is a schematic diagram showing a structure of deep holes in a light guide plate according to an embodiment of the present disclosure.

Referring to FIGS. 9A and 9B, an embodiment of the present disclosure provides another backlight unit, which is an improvement based on that according to the embodiment of FIG. 8A. Specifically, the textured pattern structure includes the local area layers 5A, and further includes a plurality of holes deep holes 31 provided at the light incident surface of the light guide plate 3 and in the non-irradiated regions of the light guide plate 3. In other words, the plurality of deep holes 31 are provided in the light guide plate 3 and correspond to at least a portion regions of the optical microstructure layer 4 other than the plurality of optical microstructures 41. It should be noted that, the term "deep" in the deep holes 31 is relative to a size of the "textured pattern film 5". That is, a height of each of the deep holes 31 in the vertical direction (i.e., a stacking direction) in the drawings is greater than a height of a convex-concave structure of the "textured pattern film 5".

Specifically, as shown in FIG. 9A, the light exit surface of the light guide plate 3 has the optical microstructures 41 and the local area layers 5A provided thereon in a same layer, and the non-irradiated regions of the light incident surface of the light guide plate 3 has a plurality of deep holes 31 provided therein. Each of the deep holes 31 may have a depth greater than 50 μm, or each of the deep holes 31 may penetrates through the light guide plate 3, to achieve a high diffusion efficiency. A distribution density of the deep holes 31 may be adjusted to achieve the desired light extraction efficiency. Each of the plurality of deep holes 31 may have a rectangular cross section in a direction perpendicular to the stacking direction. In some embodiment, the cross section in the direction perpendicular to the stacking direction may be the cross section as shown in the drawings, a cross section perpendicular to the cross section as shown in the drawings, or both of them. Each of the plurality of deep holes 31 cause at least a portion of the light propagating in the light guide plate 3 by total internal reflection undergoes total internal reflection only in a local region, thereby achieving local diming. For example, in a case of displaying a high-dynamic range (HDR) image, with respect to a high brightness portion or a low brightness portion in the image, a brightness of the corresponding LED chip 21 may be adjusted by a controller of the backlight unit, and each of the deep holes 31 limits the propagation of the light emitted from the corresponding LED chip 21 having the adjusted brightness in the light guide plate 3 within the ranges corresponding to the high brightness portion or the low brightness portion, thereby achieving local diming.

Figure 9C:
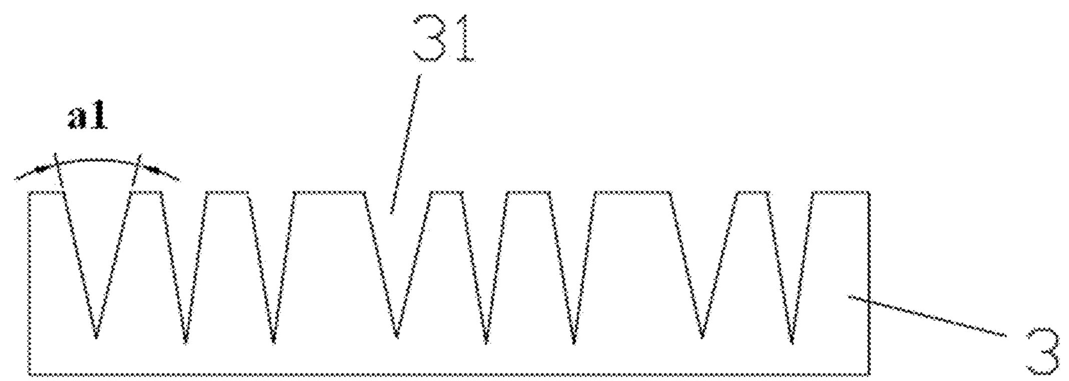
FIG. 9C is a schematic diagram showing another structure of deep holes in a light guide plate according to an embodiment of the present disclosure.

In an embodiment, as shown in FIG. 9C, a cross section of each of the deep holes 31 in the direction perpendicular to the stacking direction may be an isosceles triangle, of which two waists have an acute angle therebetween, thereby further reducing an amount of light propagating by total internal reflection, and further improving the effect of local diming. The acute angle may have a value raging from 20° to 60°.

Figure 9D:
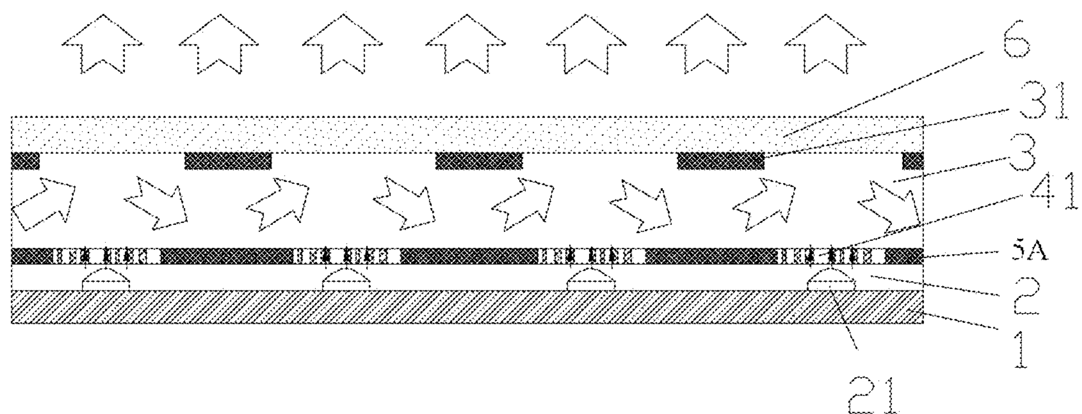
FIG. 9D is a schematic diagram showing a structure of another backlight unit according to an embodiment of the present disclosure.
Figure 9E:
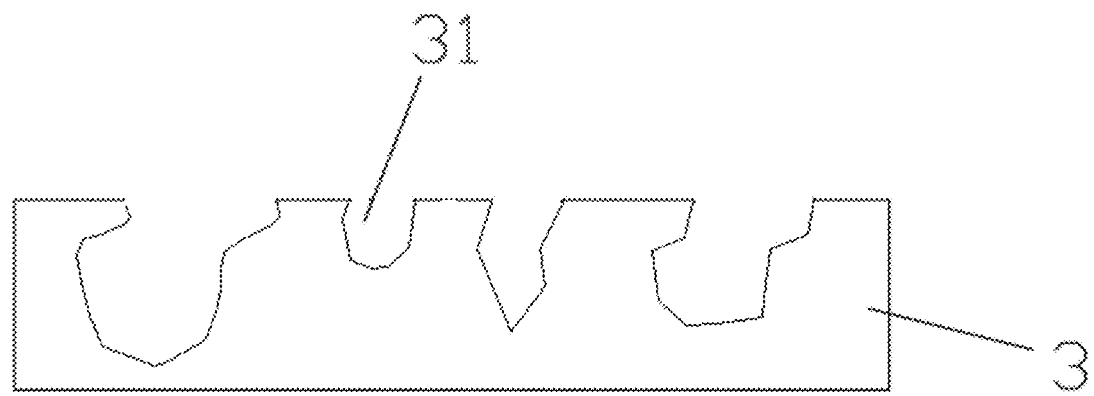
FIG. 9E is a schematic diagram showing another structure of deep holes in a light guide plate according to an embodiment of the present disclosure.

In an embodiment, as shown in FIG. 9E, a cross section of each of the deep holes 31 in the direction perpendicular to the stacking direction may be an irregularly curved surface, which may also further reduce an amount of light propagating by total internal reflection, and further improve the effect of local diming.

In addition, in an embodiment, to further increase a diffusion efficiency, each of the deep holes 31 may have a dielectric material provided (e.g., filled) therein, and a difference value between a refractive index of the dielectric material and a refractive index of the light guide plate 3 is greater than a predetermined value. The predetermined value may be not less than 0.5. The dielectric material may be an adhesive, an inorganic dielectric (e.g., $Si_3N_x$, ZrO, Si, or the like), or a combination thereof, which has a high refractive index. Alternatively, the dielectric material may also include an adhesive with metal nanoparticles mixed therein. Since the resonance effect of surface plasma of metal nanoparticles (such as Al, Ag, Au, etc.) may result in the characteristics of super scattering cross section, the adhesive with the metal nanoparticles mixed therein is filled in each of the deep holes 31 to improve a scattering efficiency, while a transmittance of the light guide plate 3 is not significantly affected. Each of the metal nanoparticles may have a diameter ranging from 10 nm to 200 nm.

It should be noted that, as shown in FIG. 9D, the optical microstructures 41 and the local area layers 5A provided in a same layer may be arranged on the light incident surface of the light guide plate 3. In this case, the plurality of deep holes 31 are provided in the non-irradiated regions of the light exit surface of the light guide plate 3.

It should be further noted that, the textured pattern structure may not include the local area layers 5A, and may include the plurality of deep holes 31 provided in the non-irradiated regions of the light incident surface or the light exit surface of the light guide plate 3 only. Specifically, for the example shown in FIG. 9A, the textured pattern structure may include the plurality of deep holes 31 provided in the non-irradiated regions of the light incident surface of the light guide plate 3, and the optical microstructure layer 4 is provided on the light exit surface of the light guide plate 3. Alternatively, for the example of FIG. 9D, the textured pattern structure may include the plurality of deep holes 31 provided in the non-irradiated regions of the light exit surface of the light guide plate 3, and the optical microstructure layer 4 is provided on the light incident surface of the light guide plate 3.

As another technical solution, an embodiment of the present disclosure provides a display device, which includes the backlight unit according to any one of the foregoing embodiments of the present disclosure.

To sum up, in the method for manufacturing an optical microstructure, the method for manufacturing an optical microstructure layer, the backlight unit, and the display device provided by the foregoing embodiments of the present disclosure, by performing holographic exposure on the photopolymer film, a planar refractive index modulated phase-type microstructure may be formed, thereby manufacturing a large-sized product, and manufacturing a cross-scale optical microstructure by manufacturing sub-blocks thereof. Further, the resultant planar optical microstructure can avoid the change of a phase distribution of a holographic lens due to lamination of film layers or filling between film layers. Thus, improved feasibility of mass production and improved reliability of a product can be achieved.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A backlight unit, comprising a light guide plate comprising a light incident surface and a light exit surface opposite to the light incident surface;

an LED layer provided on the light incident surface of the light guide plate, and comprising a plurality of LED chips arranged in an array;

an optical microstructure layer provided on one of the light incident surface and the light exit surface of the light guide plate, and comprising a plurality of optical microstructures in one-to-one correspondence with the plurality of LED chips, wherein each of the plurality of optical microstructures is configured to cause at least a portion of light emitted from a corresponding LED chip to propagate in the light guide plate by total internal reflection; and a textured pattern structure provided on at least one of the light incident surface and the light exit surface of the light guide plate, and configured to cause at least a portion of light coupled into the light guide plate to exit from the light guide plate.

2. The backlight unit according to claim 1, wherein each of the plurality of optical microstructures is a holographic grating structure.

3. The backlight unit according to claim 2, wherein the optical microstructure layer is provided between the light guide plate and the LED layer, and each of the plurality of optical microstructures is a transmissive holographic grating structure.

4. The backlight unit according to claim 2, wherein the optical microstructure layer is provided on the light exit surface of the light guide plate, and each of the plurality of optical microstructures is a reflective holographic grating structure.

5. The backlight unit according to claim 2, wherein the holographic grating structure comprises a plurality of sub-gratings arranged with an interval therebetween, and the plurality of sub-gratings are configured to cause light incident thereon to propagate in substantially a same direction after being diffracted or reflected by the plurality of sub-gratings.

6. The backlight unit according to claim 2, wherein the holographic grating structure is substantially a circle as a whole and comprises a plurality of ring structures, and the plurality of ring structures are concentrically arranged with a center of an orthographic projection of the LED chip corresponding to the holographic grating structure comprising the plurality of ring structures on the optical microstructure layer as a center of the circle.

7. The backlight unit according to claim 5, wherein an average refractive index of the sub-grating located at an edge of each optical microstructure is greater than an average refractive index of the sub-grating located at a center of the optical microstructure.

8. The backlight unit according to claim 1, wherein the textured pattern structure comprises a textured pattern film, and the optical microstructure layer and the textured pattern film are provided on the light incident surface and the light exit surface of the light guide plate, respectively.

9. The backlight unit according to claim 1, wherein the textured pattern structure comprises a textured pattern film, the optical microstructure layer and the textured pattern film are both provided on the light exit surface of the light guide plate, and the optical microstructure layer is provided between the light guide plate and the textured pattern film.

10. The backlight unit according to claim 1, wherein the textured pattern structure and the optical microstructure are provided in a same layer.

11. The backlight unit according to claim 1, wherein the textured pattern structure further comprises a plurality of holes provided in the light guide plate at positions corresponding to at least a portion of regions other than the plurality of optical microstructures of the optical microstructure layer.

12. The backlight unit according to claim 11, wherein each of the plurality of holes has a depth greater than 50 μm, or penetrates through the light guide plate.

13. The backlight unit according to claim 11, wherein a cross section of each of the plurality of holes in a direction perpendicular to a stacking direction, along which the light guide plate and the optical microstructure layer are stacked, is one of a rectangle, an isosceles triangle, and an irregularly curved surface.

14. The backlight unit according to claim 11, wherein each of the plurality of holes is provided with a dielectric material therein, and a difference value between a refractive index of the dielectric material and a refractive index of the light guide plate is greater than a predetermined value that is not less than 0.5.

15. A display device, comprising the backlight unit according to claim 1.

16. A method for manufacturing a backlight unit, comprising steps of preparing a light guide plate comprising a light incident surface and a light exit surface opposite to the light incident surface;

forming an LED layer on the light incident surface of the light guide plate, wherein the LED layer comprises a plurality of LED chips arranged in an array;

forming an optical microstructure layer on one of the light incident surface and the light exit surface of the light guide plate, wherein the optical microstructure layer comprises a plurality of optical microstructures in one-to-one correspondence with the plurality of LED chips, and each of the plurality of optical microstructures is configured to cause at least a portion of light emitted from a corresponding LED chip to propagate in the light guide plate by total internal reflection; and forming a textured pattern structure on at least one of the light incident surface and the light exit surface of the light guide plate, wherein the textured pattern structure is configured to cause at least a portion of light coupled into the light guide plate to exit from the light guide plate.

17. The method according to claim 16, wherein the step of forming an optical microstructure layer on one of the light incident surface and the light exit surface of the light guide plate comprises steps of forming a photopolymer film on one of the light incident surface and the light exit surface of the light guide plate; and performing holographic exposure on the photopolymer film to form the optical microstructure layer.

18. The method according to claim 17, wherein the step of performing holographic exposure on the photopolymer film comprises steps of performing phase modulation on a laser beam by laser wavefront modulation to obtain a modulated laser beam; and performing exposure on the photopolymer film by using the modulated laser beam.

19. The method according to claim 18, further comprising a step of performing exposure on the entire of the photopolymer film.

* * * * *